US008296220B2

(12) United States Patent
Almeida et al.

(10) Patent No.: US 8,296,220 B2
(45) Date of Patent: Oct. 23, 2012

(54) QUOTE AND ORDER ENTRY INTERFACE

(75) Inventors: Cassius Almeida, Omaha, NE (US);
Arthur Lussier, Baltimore, MD (US);
Jim Logue, Laurel, MD (US); Dominic Faloni, Finksburg, MD (US)

(73) Assignee: T.D. Ameritrade IP Company, Inc., Columbia, MD (US)

( * ) Notice: Subject to any disclaimer, the term of this patent is extended or adjusted under 35 U.S.C. 154(b) by 0 days.

(21) Appl. No.: 12/943,823

(22) Filed: Nov. 10, 2010

(65) Prior Publication Data
US 2011/0060677 A1     Mar. 10, 2011

Related U.S. Application Data

(63) Continuation of application No. 10/765,998, filed on Jan. 29, 2004, now Pat. No. 7,835,972.

(60) Provisional application No. 60/443,178, filed on Jan. 29, 2003.

(51) Int. Cl.
*G06Q 40/00* (2006.01)
(52) U.S. Cl. ........................ 705/37; 705/36 R
(58) Field of Classification Search .............. 705/37, 705/36 R, 35, 14.1, 7.11, 26.1, 27.1, 27.2, 705/28, 38
See application file for complete search history.

(56) References Cited

U.S. PATENT DOCUMENTS

| 4,648,038 | A | * | 3/1987 | Roberts et al. | 705/36 R |
|---|---|---|---|---|---|
| 4,799,156 | A | * | 1/1989 | Shavit et al. | 705/26.3 |
| 4,984,180 | A | * | 1/1991 | Wada et al. | 345/619 |
| 5,689,651 | A | | 11/1997 | Lozman | |
| 5,991,809 | A | * | 11/1999 | Kriegsman | 709/226 |
| 6,370,580 | B2 | * | 4/2002 | Kriegsman | 709/226 |
| 6,480,893 | B2 | * | 11/2002 | Kriegsman | 709/226 |
| 6,516,416 | B2 | | 2/2003 | Gregg et al. | |
| 6,915,329 | B2 | * | 7/2005 | Kriegsman | 709/203 |
| 7,110,969 | B1 | * | 9/2006 | Bennett et al. | 705/35 |
| 2001/0018709 | A1 | * | 8/2001 | Kriegsman | 709/226 |
| 2001/0027480 | A1 | * | 10/2001 | Kriegsman | 709/217 |
| 2001/0051907 | A1 | * | 12/2001 | Kumar et al. | 705/36 |
| 2002/0019810 | A1 | * | 2/2002 | Kumar et al. | 705/42 |
| 2002/0023004 | A1 | * | 2/2002 | Hollander et al. | 705/22 |
| 2002/0054152 | A1 | * | 5/2002 | Palaniappan et al. | 345/810 |
| 2002/0082849 | A1 | * | 6/2002 | Tenorio | 705/1 |
| 2003/0004853 | A1 | * | 1/2003 | Ram et al. | 705/37 |
| 2003/0009411 | A1 | * | 1/2003 | Ram et al. | 705/37 |
| 2003/0033212 | A1 | * | 2/2003 | Sandhu et al. | 705/26 |

(Continued)

OTHER PUBLICATIONS

Hill, Joanne M. "Program trading of equities: renegade or mainstream?" Nov.-Dec. 1989Business Horizons , v32 , n6 , p47(9).*

(Continued)

*Primary Examiner* — Kelly Campen
(74) *Attorney, Agent, or Firm* — Foley & Lardner LLP

(57) ABSTRACT

A graphical user interface centralizes Level I quote information in the center of a circular display while Level II (or regional) data appears in peripheral bands layered on the outside of the Level I information. The interface is also split into two main sections, a "bid" quote information section and an "ask" quote information section. The bid quote information appears on the left of the interface while the ask quote information appears on the right side of the interface. Through clicking in any one of the peripheral bands, an order can be placed at that price point.

20 Claims, 17 Drawing Sheets

U.S. PATENT DOCUMENTS

| | | | |
|---|---|---|---|
| 2003/0177086 A1* | 9/2003 | Gomber et al. | 705/37 |
| 2005/0038851 A1* | 2/2005 | Kriegsman | 709/203 |
| 2008/0005271 A1* | 1/2008 | Baluja et al. | 709/217 |
| 2008/0040294 A1* | 2/2008 | Tenorio | 705/400 |

OTHER PUBLICATIONS

Anonymous "Automation of securities markets and regulatory implications. (includes index of special features published in Financial Market Trends, periodical, 1977-1991) (Special Feature)" Oct. 1991 Financial Market Trends, n50, p20(33).*

Zaheer, Srilata "Circadian rhythms: The effects of global market integration in the currency trading industry" Fourth Quarter 1995 Journal of International Business Studies v26n4 pp. 699-728.*

Dumas et al. "Implied volatility functions: empirical tests."Dec. 1998 Journal of Finance, 53, 6, 2059(4).*

Hill, Joanne M. "Program trading of equities: renegade or mainstream?" Nov.-Dec. 1989 Business Horizons, V32, n6, p47(9).

Anonymous "Automation of securities markets and regulatory implications. (includes index of special features published in Financial Market Trends, periodical, 1977-1991) (Special Feature)" Oct. 1991 Financial Market Trends, n50, p20(33).

Zaheer, Srilata "Circadian rhythms: The effects of global market integration in the currency trading industry" Fourth Quarter 1995 Journal of international Business Studies v26, n4, pp. 699-728.

Dumas et al. "Implied volatility functions: empirical tests." Dec. 1998 Journal of Finance, 53, 6, 2059(4).

* cited by examiner

QUOTE AND ORDER ENTRY INTERFACE

RELATED APPLICATION DATA

This application is a continuation of U.S. application Ser. No. 10/765,998, filed Jan. 29, 2004, which claims the benefit of and priority under 35 U.S.C. §119(e) to U.S. patent application Ser. No. 60/443,178, filed Jan. 29, 2003, entitled "Quote And Order Entry Interface", which is herein incorporated by reference in its entirety.

BACKGROUND OF THE INVENTION

1. Field of the Invention

This invention generally relates to the displaying of information. In particular, this invention relates to the displaying of information related to stock trading and order entry.

2. Description of Related Art

The trading of stocks is generally divided into two different categories. The first category is where the majority of trading is done face-to-face on a trading floor. This type of trading referred to as a "listed" exchange. Orders generally come in through brokerage firms that are members of the exchange and flow down to floor brokers who go to a specific spot on the floor where the stock trades. At this specific location there is a "specialist" who matches buyers and sellers. Prices are generally determined using an auction type method.

The second type of exchange is an over-the-counter market, synonymous with the NASDAQ® exchange. The over-the-counter markets have no central location or floor and trading is done electronically through a network of dealers. With the over-the-counter market, brokerages act as "market makers" for various stocks where the market maker provides continuous bid and ask prices within a prescribed percentage spread for shares for which they are designated to make a market.

As discussed above, market makers provide continuous bid and offer prices. Furthermore, market makers enhance stock liquidity and assist in long-term growth of the market.

For over-the-counter trades, there are a variety of ways that security prices are quoted to traders. These various ways can depend on, for example, the amount of information desired, access rights, and fees paid to the quoting service. For Level I access, which is generally published and seen as the "real-time quote" on the Internet, real-time bid/ask quotes for securities trading on the NASDAQ® are provided. Level I access is fairly limited in terms of the information it provides since it does not disclose who is biding or asking for the stock, and it does not illustrate how many shares the market maker desires. While Level I shows the current quote, the current quote may be for a different lot than what the trader is trading and a trader's order could be passed around until a market maker can profit from the order.

Level II includes all the information from Level I and also provides real-time access to the quotations of individual market makers registered in every NASDAQ® listed security, as well as the offering or biding lots they desire. Level II access also provides the name of the market maker looking to trade the stock and allows traders to see which market makers are showing the most interest in a stock by identifying the patterns for each market maker. Generally, Level II access is a subscription-based service depending on, for example, the number of trades the trader makes, commissions, or the like.

Level III trading is cumulative of Level I and II and also includes the ability to enter quotes, execute orders and send information. Level III trading is generally restricted to NASD member firms that function as registered market makers.

A typical Level II quote display for NASDAQ® stocks is illustrated in FIG. 1. In FIG. 1, the Level II quote display 9 includes various information such as the stock symbol, last price, change information, volume information, and high and low price information. Furthermore, the Level II quote display is divided into two columns, the bid column 15 and the ask column 17. Within these two columns, the display sorts data so that the highest bid price and the lowest ask price are on the top of the columns, respectively, with the colors in each section representing the price point with all the market participants at the same price represented by the same color. For example, in the quote display 9 illustrated in FIG. 1, market participants at the same price are represented by the same color bands 13 with the thickness of each color band being proportional to the number of market participants at that price point.

Level II access allows traders to view changes to NAS-DAQ® equity price and size dynamically and in real-time across multiple market makers, ECNs (Electronic Communication Networks) and exchanges. Viewing the price and size movement of all market participants allows users to closely follow, and sometimes predict, the direction and flavor of the market. For example, as size, i.e., liquidity, builds on one side of the market, often there is a price move away from this liquidity pool. It is valuable for a trader to see the list of market makers as well as the size and liquidity changes that may impact feature price movements.

SUMMARY OF THE INVENTION

To enhance the information available to a user, such as a trader, a dynamic visual representation of size is needed. By representing these changes visually with colors and shapes, a user can better gauge and react to liquidity and price changes in the market place. For example, if the key data is centralized on a display, users can save time with less peripheral vision scanning. By adding integrated order entry using, for example, one mouse click, users can react instantly to market opportunities. Furthermore, providing sophisticated monitoring indicators such as a liquidity flow indicator (LFI) and a liquidity ratio (LR) can provide users with a trading edge.

The exemplary quote and order interface is capable of delivering real-time Level II (or regional for listed equities) equity quote information. A graphical user interface centralizes Level I quote information in the center of a circular display while Level II (or regional) data appears in peripheral bands layered on the outside of the Level I information. The interface is also split into two main sections, a "bid" quote information section and an "ask" quote information section. In accordance with an exemplary embodiment, the bid quote information appears on the left side of the interface while the ask quote information appears on the right side of the interface.

The primary bands represent price points while secondary bands within the primary bands represent market participants at that particular price point. As an example, both the primary and secondary band widths can be proportional to the liquidity, i.e., share size. For the primary band at a particular price point, the width represents all the liquidity from all market participants. The secondary band width within the primary band can represent the liquidity for a particular market participant(s). The bands can be configured in various ways including a proportional relationship, for a true relative liquidity comparison. For example, a bandwidth size "10" will be 10 times wider than a bandwidth size "1." For equities with significant liquidity, it may be advantageous to view the interface with a logarithmic setting and to allow the user to select from log X values ranging from, for example, 2 to 10. For this exemplary configuration, with a log X equal to 10, a bandwidth size of "100" will be twice the width of a bandwidth size "10."

Other exemplary band configuration settings include, but are not limited to, linear, scale to fit, and volume sensitive. Furthermore, the user can select a minimum bandwidth option which will be applied to the smallest size increment and then all other bands will be relative to that setting. Therefore, the combination of all these band settings can provide users the ability to completely customize the look and usability of the interface based on, for example, their personal preferences, trading style, equity personalities, monitor size, screen resolution, or the like.

The exemplary system also allows users to quickly place orders, such as equity orders. This can be accomplished in several ways. The exemplary primary method comprises placing orders by clicking the mouse on any price band which will generate a limit order with the price of the band that was clicked upon. Whether the order is placed as a buy or sell is dependent upon which quadrant i.e., the left quadrant (bid) or right quadrant (ask). For example, the system will detect a click in any quadrant and reconcile that with the band that was selected and assemble an order based on this combination of factors.

Another option for placing order involves the selecting of "split-buy" and "split-sell" buttons within the interface. Selecting one of these button will place a limit order at a price between the "inside market," i.e., the highest bid and lowest ask price. If the price difference between the bid and ask is not divisible by two, the price can be rounded, for example, to one penny from the side of the market the user desires to be on.

An alternative way of placing an order is by simply generating a blank trade ticket through the selection of a buy stock or sale stock icon where a user can, for example, fill in the appropriate information on the ticket in order to place an order.

In addition to the quote interface, two indicators are also provided to users to assist with trading transactions. The two indicators generally indicate whether the market is bullish or bearish based on liquidity. The first indicator is a Liquidity Ratio (LR) interface that provides a snap shot of the total sizes on the bid side divided by the total sizes on the ask side based on the number of price points displayed by the user. For example, this can be set in a preference file by the user which stipulates the maximum number of bands. The other indicator is a Liquidity Flow Indicator (LFI) module that is capable of measuring the changes to liquidity and determining in which direction the flow is moving over time, i.e., whether the liquidity is building or fading.

Accordingly, exemplary aspects of the invention relate to the display of information.

Additional exemplary aspects of the invention relate to the display of stock quote information.

Addition exemplary aspects of the invention also relate to a quote and order interface for the trading of stocks.

Further exemplary aspects of the invention relate to providing a liquidity ratio indicator.

Still further exemplary aspects of the invention relate to providing a liquidity flow indicator.

Additional exemplary aspects of the invention relate to providing a stock order interface.

Exemplary aspects of the invention also relate to providing a dynamic real-time quote and order entry interface that allows one or more of standard order entry, one-click ordering or express trading.

Further exemplary aspects of the invention relate to determining and assembling and order ticket based on the location of a selection tool within a quote interface.

Still further aspects of the invention relate to providing a dynamic combined Level I and Level II stock quote and order graphical user interface.

These and other features and advantages of this invention are described in, or are apparent from, the following detailed description of the exemplary embodiments.

BRIEF DESCRIPTION OF THE DRAWINGS

The exemplary embodiments of the invention will be described in detail, with reference to the following figures, wherein.

DETAILED DESCRIPTION

Figure 1:
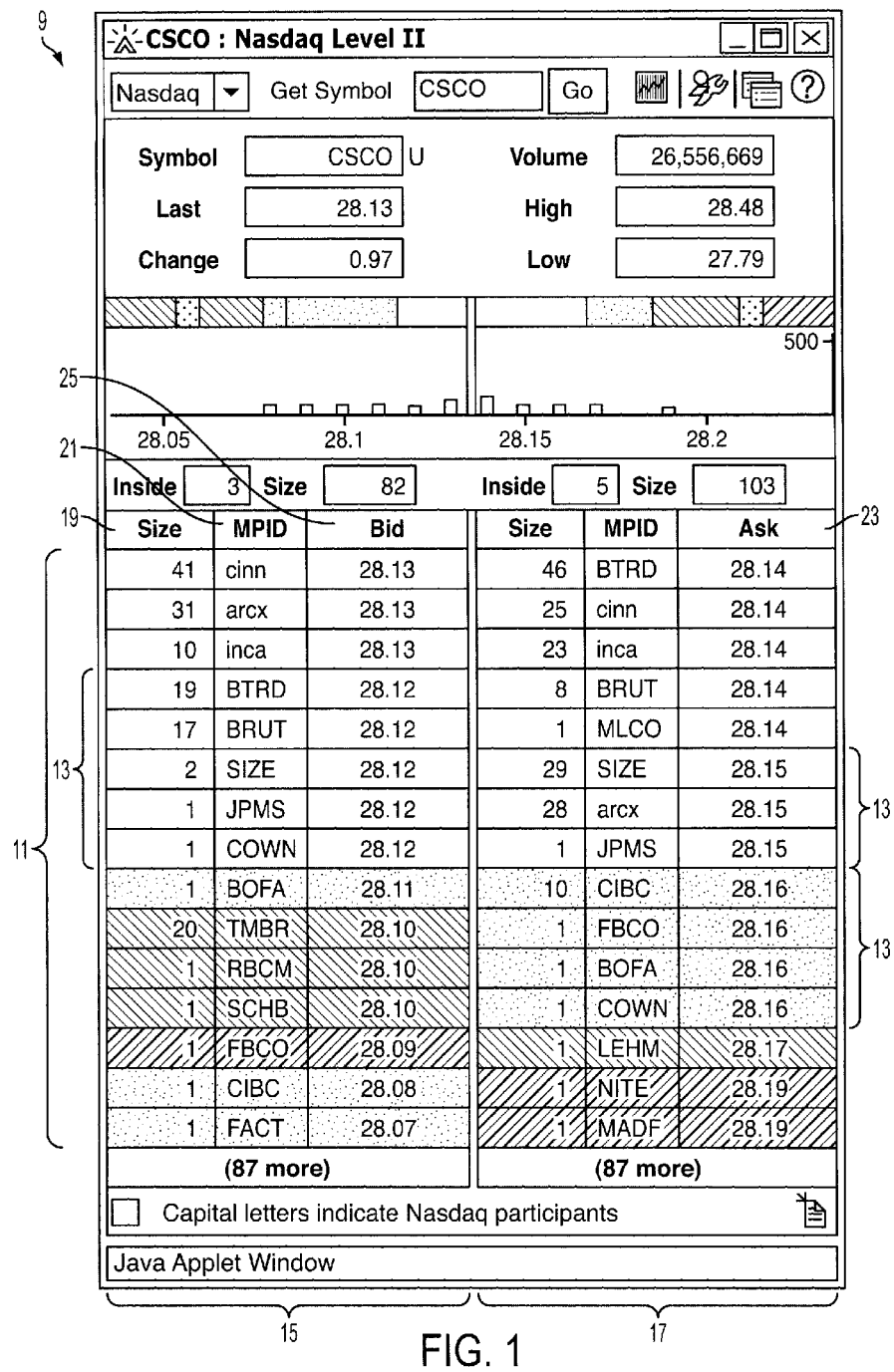
FIG. 1 illustrates an exemplary Level II interface.

The exemplary systems and methods of this invention will be described in relation to a quote and order system. However, to avoid unnecessarily obscuring the present invention, the following description omits well-known structures and devices that may be shown in block diagram form or otherwise summarized. For the purpose of explanation, numerous specific details are set forth in order to provide a thorough understanding of the present invention. It should be appreciated, however, that the present invention may be practiced in a variety of ways beyond the specific details set forth herein. For example, while the systems and methods of this invention will be discussed in relation to Level II trading on the NASDAQ®, it should be appreciated that the system can be adapted to any type of trading to any foreign or domestic market. Furthermore, and more generally, the general concepts disclosed herein can be adapted for the display of any type of information. Specifically, it is to be appreciated that the basic concepts disclosed herein can be expanded to any sets of data with subsets of data. Some non-limiting examples of how this interface may be used for financial data are as follows:

Options Data
    Options Quotes
    Options Chains
    Options Greeks
    Complex Options Analysis (two-option comparison or underlying equity and option comparison)
    Level I Equity Quotes (a miniaturized quote and order system with only one band)
    Equity Sector or Industry Analysis
    Asset Allocation Tools
    NASDAQ SuperMontage Data®
    NYSE Open Book Data®
    Comparison of any two similar financial instruments (bonds, mutual funds, annuities, etc.)

It is also be possible to expand the application of the technology disclosed herein beyond financial data. For example, any time a comparison of two or more (depending on how many sections are utilized) sets of data (with or without subsets) is used, the systems and methods of this invention can facilitate analysis.

Furthermore, while the exemplary embodiments illustrated herein show the various components of the quote and order system colocated, it is to be appreciated that the various components of the system can be located at distant portions of a distributed network, such as a telecommunications network and/or the Internet, or within a dedicated quote and order system. Thus, it should be appreciated that the various components illustrated herein can be combined into one or more devices or colocated on a particular node of a distributed network, such as a telecommunications network, the Internet, a private network, a secured or unsecured network or any combination thereof. It will be appreciated from the following description, and for reasons of computational efficiency, that the components of the quote and order system can be arranged in any location within a distributed network without affecting the operation of the system.

Furthermore, it should be appreciated that the various links connecting the elements can be wired or wireless links, or any combination thereof, or any other known or latter developed element(s) that is capable of supplying and/or communicating data to and from the connected elements. Additionally, the term module as used herein can refer to any known or later developed hardware, software or combination of hardware and software that is capable of performing the functionality associated with that element.

Figure 2:
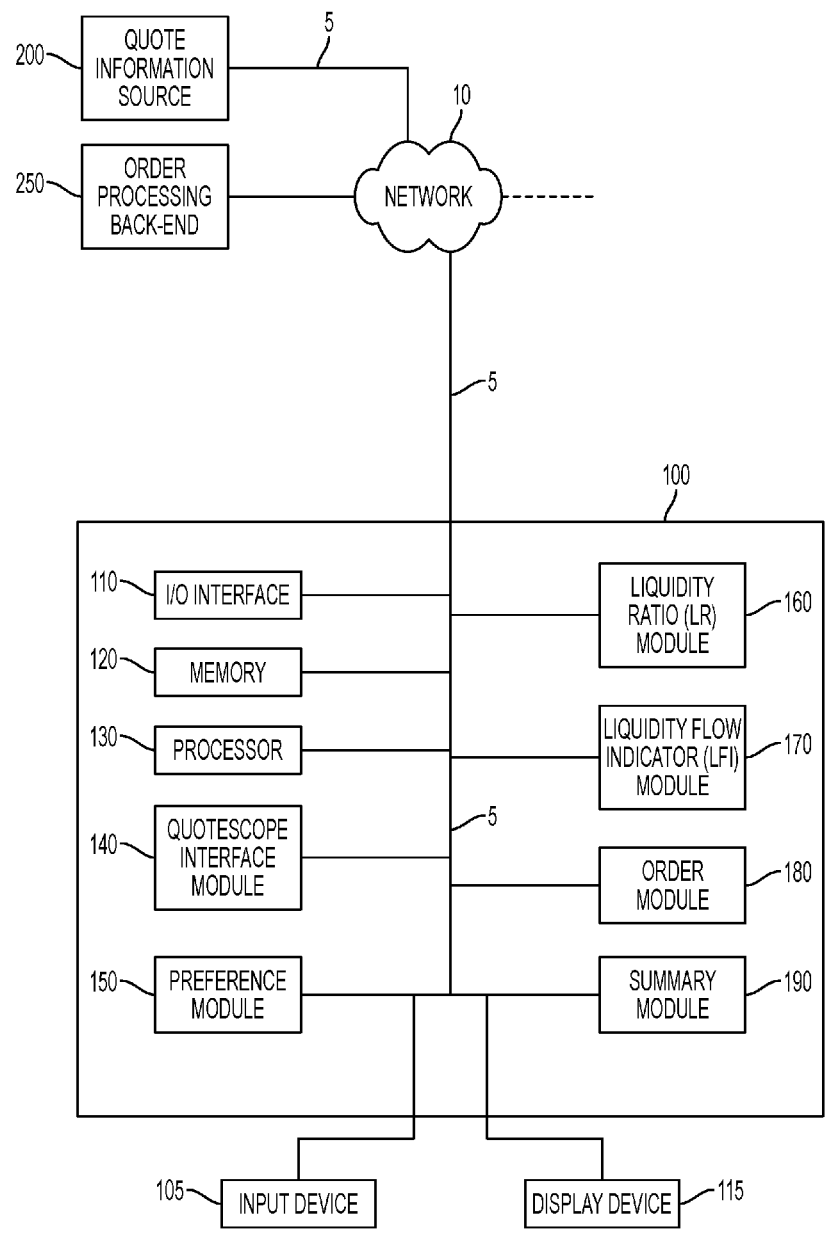
FIG. 2 is a functional block diagram illustrating an exemplary quote and order system according to this invention.

FIG. 2 illustrates an exemplary quote and order system 100. The quote and order system 100 comprises an I/O interface 110, a memory 120, a processor 130, a quote and order interface module 140, a preference module 150, a liquidity ratio module 160, a liquidity flow indicator module 170, an order module 180 and a summary module 190, all interconnected via links 5. The quote and order system 100 is also connected to one or more input devices 105, such as a keyboard and/or mouse, and one or more display devices 115, such as a CRT, LCD display, computer monitor, or the like. While the exemplary embodiment discussed herein will focus on the use of a mouse as the input device 105, it should be appreciated that the use of voice-activated commands to drive the interface and place orders can also be used with equal success.

Additionally, the quote and order system 100 is connected via one or more networks 10, to one or more quote information sources 200. Furthermore, the quote and order system 100 is connected to one or more order processing back-ends 250, via a secure or non-secure connection, that handle the satisfaction and reconciliation of the order as was handled with the traditional Level II interface.

Figure 3:
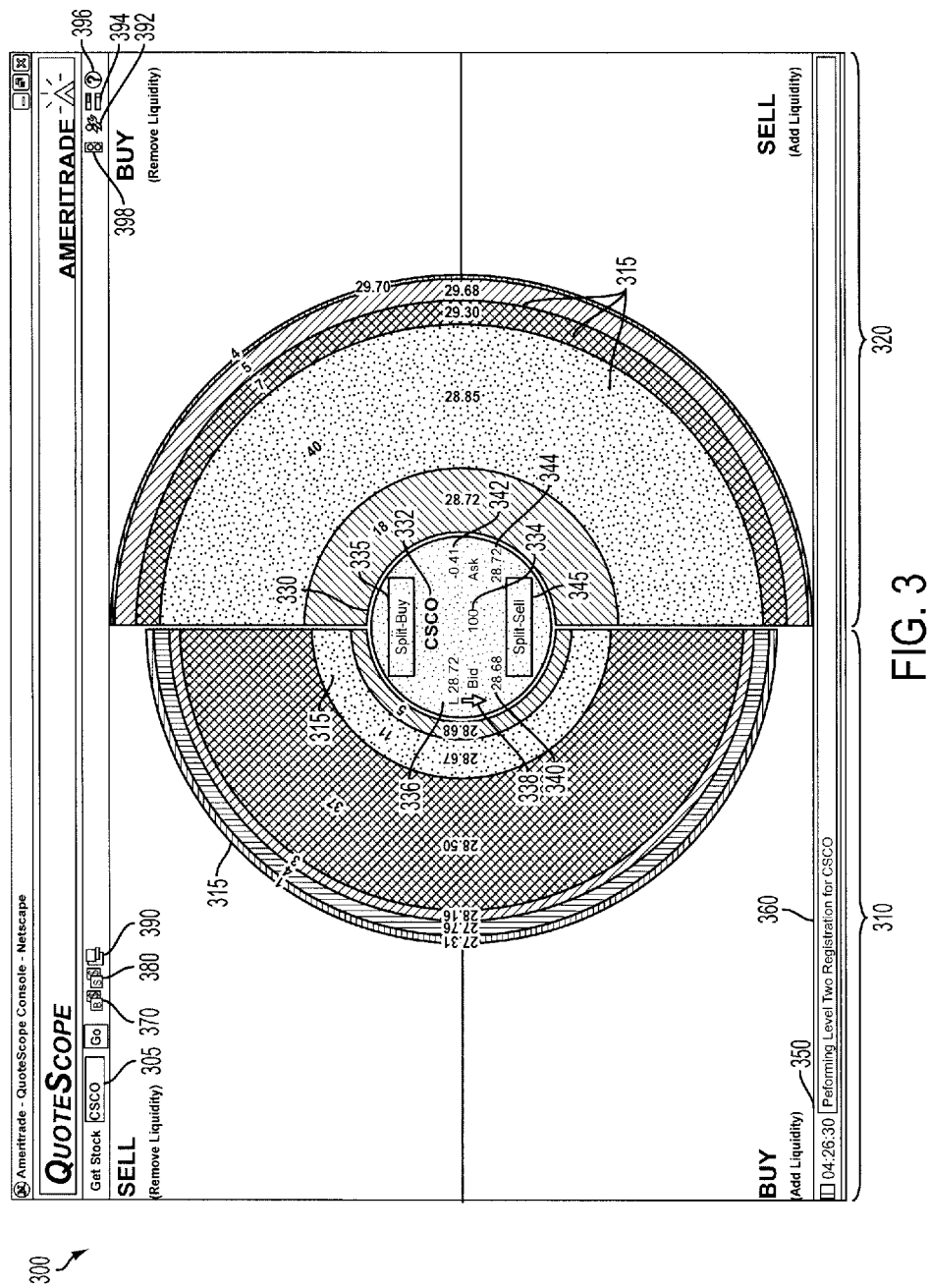
FIG. 3 illustrates and exemplary quote and order interface according to this invention.

In operation, the quote and order system 100 is initialized and establishes communication with the quote information source 200. Upon initialization of the system, the quote information source 200 provides stock quote information at a predetermined interval and, the quote and order interface 300, as illustrated in FIG. 3, with the cooperation of the quote and order system interface module 140, processor 130, memory 120 and I/O interface 110, is displayed on the display device 115. A user can then enter a stock symbol in the "Get Stock" field 305 and select "Go," for example, with the click of a mouse, to obtain information about the entered stock.

Specifically, the displayed information relating to the stock includes, but is not limited to, the Level I basic quote information 330 which includes the entered stock symbol 332, the last size 334, the last price 336, the bid tick 338, the bid price 340, the price change for the day 342 and the ask price 344. In addition, circular bands 315 are populated around the Level I basic quote information 330. The circular bands 315 represent the prices of the stock on both the bid side 310 and the ask side 320 of the market. In this exemplary embodiment, all the prices on the bid side 310 are illustrated on the left hand side of the quote and order interface 300 and prices on the ask side of the market appear on the right hand side of the quote and order interface 300. As the bands 315 dynamically expand and contract in relation to changing market conditions, and in particular share size at a price point, the user is provided with, for example, insight into the near term direction of the price of the particular entered stock.

In addition to the bid side and ask side of the quote and order interface 300, icons are provided that show the current market time 350, a status summary portion 360, that can be, for example, a scrollable field, a buy icon 370, a sell icon 380, a review order icon 390, a preference icon 392, a liquidity indicator icon 394, a help icon 396, an update toggle icon 398 and a "show traditional Level II interface" button (not shown).

The aggregate effect of the liquidity for the monitored stock can be observed by watching the dynamics of the entire bid side of the quote and order interface 300 versus the ask side 320 of the quote and order interface 300. Specifically, within each of the bid side 310 and ask side 320 are specific bands that represent the price point and number of shares at that price point. For example, in the exemplary quote and order interface 300 illustrated in FIG. 3, there are six bands on the bid side ranging from five lots (where one lot comprises 100 shares) in the first band at $28.68 to one lot in the outermost band at $27.31. Similarly, on the ask side 320, there are eighteen lots at $28.72 and four at $29.70.

Figure 4:
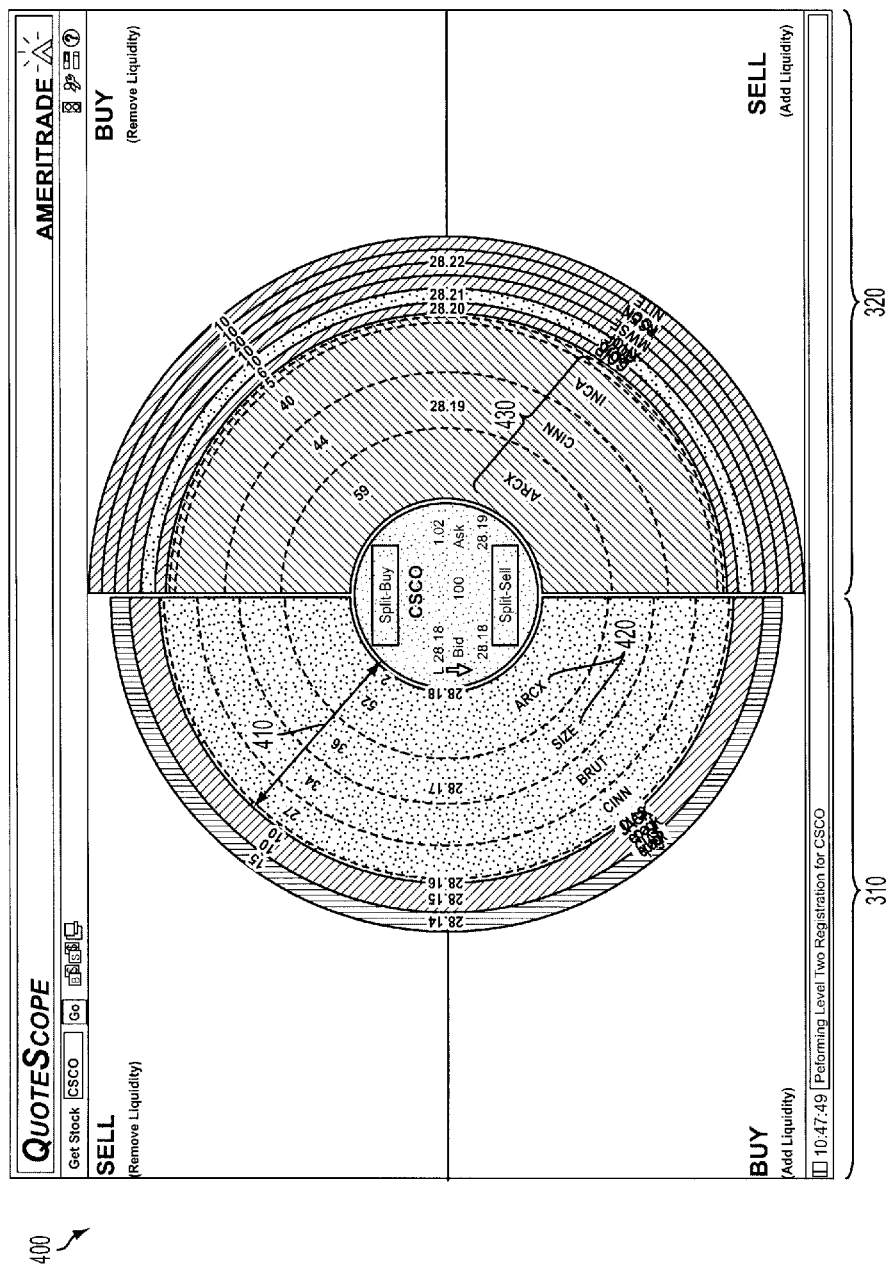
FIG. 4 illustrates a second exemplary quote and order interface according to this invention.

As illustrated in the second exemplary quote and order interface 400 of FIG. 4, each price point 410 comprises one or more market participants 420 that are offering a particular number of lots. Thus, by selecting the band settings option via the preference icon 392, as will be discussed hereinafter, the market participant 420 can be displayed with their corresponding aggregate size at each price point, thus constituting the band 430.

While the exemplary quote and order interfaces 300 and 400 are illustrated as a circular display, it should be appreciated that this invention is not limited thereto. In particular, instead of a circular display, an elliptical, oval, square, rectangular, hexagonal, octagonal or any other shape can be used with similar effect.

By centralizing the field of view required to track key information including the market maker identification, the price, the size, the symbol, the last price, the last size and the change information, the center of the quote and order interface is where most of the visual focus and attention is drawn. In particular, the price and size changes at nearby price points can be easily read since they are closest to the display focal point. Nevertheless, additional information is presented in the surrounding band(s) which are all within a user's peripheral range.

Furthermore, by using the dynamically changing band concept, users can monitor changes in liquidity visually without the necessity of having to read size values across multiple price points as was the case with the conventional Level II interface. Thus, in the quote and order interface 300/400 the thickness of the color band dynamically changes in proportion to the liquidity at each price point. This allows, for example, a reduction in the time for trades and provides a better "feel" for the market. As changes in price and size occur, the band thickness dynamics can behave like a visual "liquidity flow meter." By capitalizing on these dynamics, active traders can obtain visual queues that can, for example, allow them to react more quickly to liquidity changes in the market.

Once a decision is made to place an order, the quote and order system 100 provides three different methods for placing the order. Specifically, a user can enter orders by using the split buttons 335 and 345 for split-buy and split-sell, respectively. Alternatively, a user can select the buy icon 370 or the sell icon 380. Alternatively still, a user can, for example with the click of an input device 105, such as a mouse, select a price band within a particular section.

However, given that the quote and order interface is capable of truly providing one-click real-time order placement, it is preferable that a user preconfigure their order placement preferences and establish the level of protection they desire for placing orders. Specifically, and in accordance with an exemplary embodiment, the default preferences, stored in preference module 150, will not allow a new user to place an order using the streamlined price band approach. This can help prevent users from accidentally clicking on a price band and placing an unwanted order. As discussed hereinafter, this feature can be enabled through the "enable order entry quadrant" setting in the preference menu obtained by selecting the preference icon 392.

In addition to providing the three different order entry methods, the quote and order system 100 further allows the order ticket entry and approval process to be streamlined. For example, FIGS. 5-13 illustrate exemplary order ticket preview interfaces that are obtained by selecting one of the various types of order entry methods and are dependent on, for example, the order settings saved in the preference module 150.

Thus, and in general, as a user places an order, by using one of the above methods, the user can receive a order ticket preview interface that can be prepopulated with the price of the security as defined, for example, by the liquidity band on which the user selected and for share amount that is held in the preference module 150. While quote and order does not require entry of the order terms, changes to the order can be made when an order ticket preview interface is presented.

Figure 15:
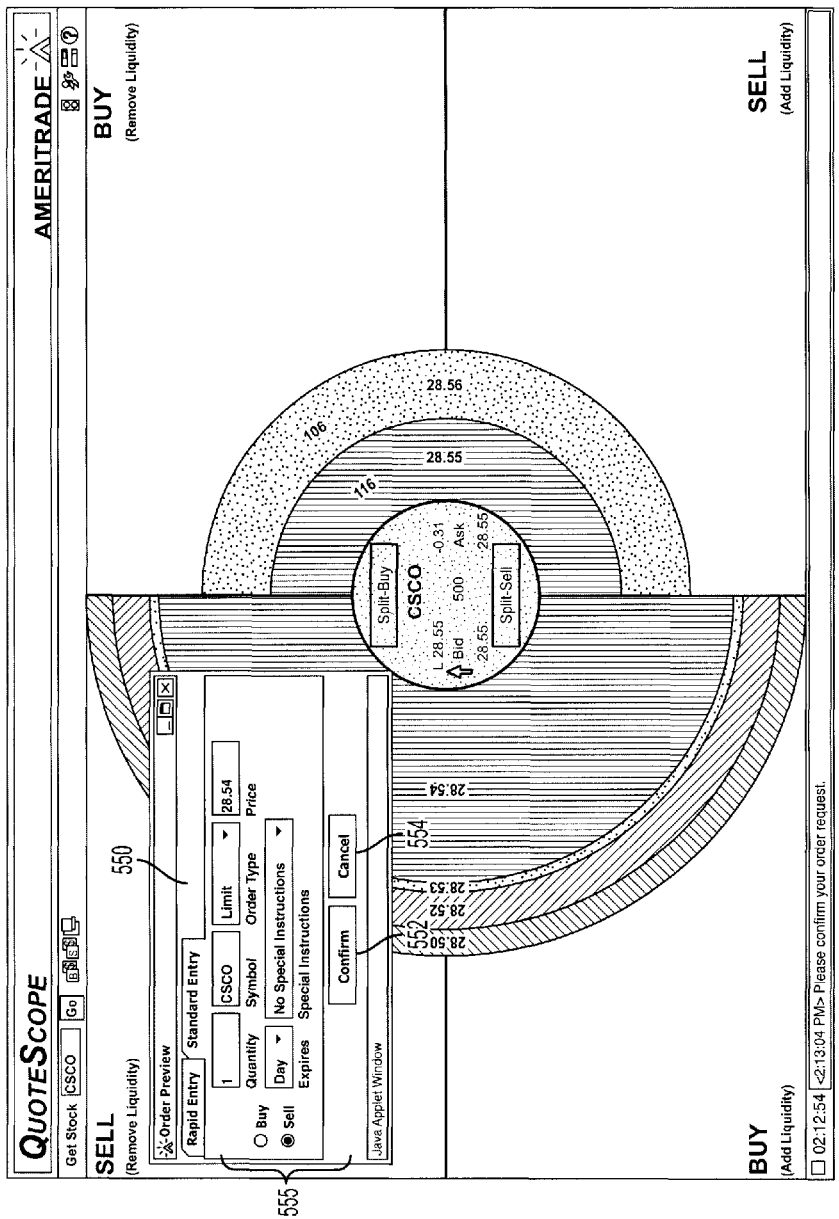
FIG. 15 illustrates an exemplary order confirmation interface according to this invention.

Alternatively, the quote and order system 100 also allows for the activation of an "express trading" mode where an order preview screen is not provided to the user. If express trading is selected, the order preview screen will be superseded by an order confirmation interface 550, as illustrated in FIG. 15 and discussed hereinafter. Alternatively, if express trading is not activated, a user will be provided with opportunities to review and edit the order before placement. Specifically, the user can review and edit the order on the order ticket preview interface and on the order confirmation interface 550 as illustrated hereinafter.

For very active intra-day traders, for example, both the order ticket preview interface and the order confirmation interface can be disabled, thus allowing the quote and order system 100 to truly function as a one-click order entry system. Specifically, by modifying the order settings through the preference interface through selection of the preference icon 392, a user can configure the quote and order system to, for example, their particular trading style and purchasing habits.

Each of the bid portion 310 and ask portion 320 of the quote and order interface 300/400 is further subdivided into buy and sell sections. In particular, and for the exemplary quote and order interface 300 illustrated in FIG. 3, the upper right "buy" quadrant provides users the ability to buy on the ask side of the market. The upper left "sale" quadrant provides users the ability to sale on the bid side of the market. Similarly, the lower left "buy" quadrant provides users the ability to buy on the bid side of the market and the lower right "sale" quadrant provides users the ability to sale on the ask side of the market.

Figure 5:
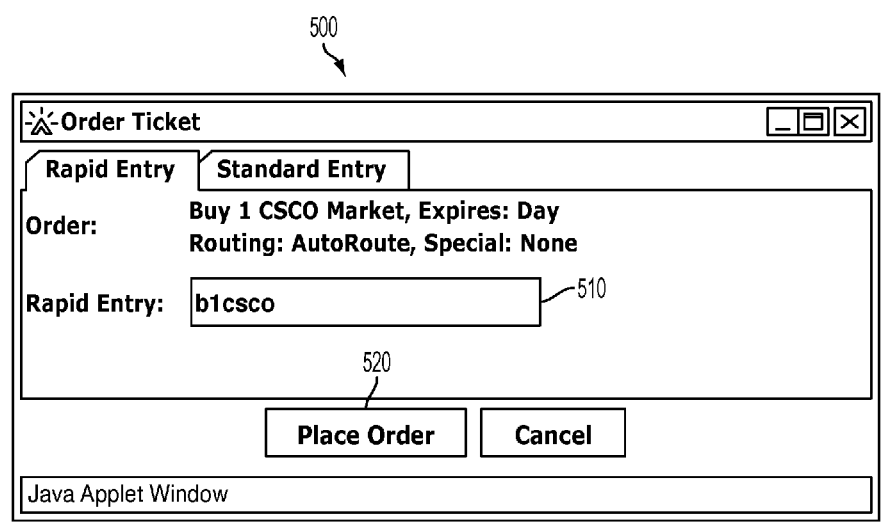
FIG. 5 illustrates an exemplary order ticket preview interface according to this invention.

As previously discussed, a user can select one of three methods for ordering. Once a method is selected, the order module 180, in cooperation with one or more of the I/O interface 110, the memory 120, processor 130 and quote and order interface module 140, and in accordance with any preferences stored in the preference module 150, assembles the order. A first exemplary order ticket preview interface 500 is illustrated in FIG. 5. A user can be provided this order ticket preview interface upon selection of either the split-buy button 335 or the buy icon 370. In particular, the order ticket preview interface 500 is a rapid entry order ticket preview interface that assembles a summary of information regarding whether the transaction is for buy or selling, the quantity, symbol, order type, expiration information and/or any special instructions. Specifically, the order characteristics are consolidated and displayed in the rapid entry window 510 that contains a "shorthand" representation of the order. Then, upon selecting the place order button 520, the order ticket confirmation interface 550 of FIG. 15 is displayed. A user can then confirm the order with the selection of the confirmation button 552, cancel the order, or, for example, return to the order ticket preview screen make changes to any one of the above quantities as desired.

Similarly, if the split-sell button 345 is selected, a sell order can be placed at the spread mid-point, or with in one cent of that point. This can be an extremely useful feature for active traders trying to get orders quickly filled in a moving market. The further enhanced usability, the quote and order system 100 will allow users to customize a split price point for buys and sells by setting values at plus or minus X cents from the mid point. These transactions are further enhanced by the fact that all of the key quote information is centered within the quote and order interface.

Figure 6:
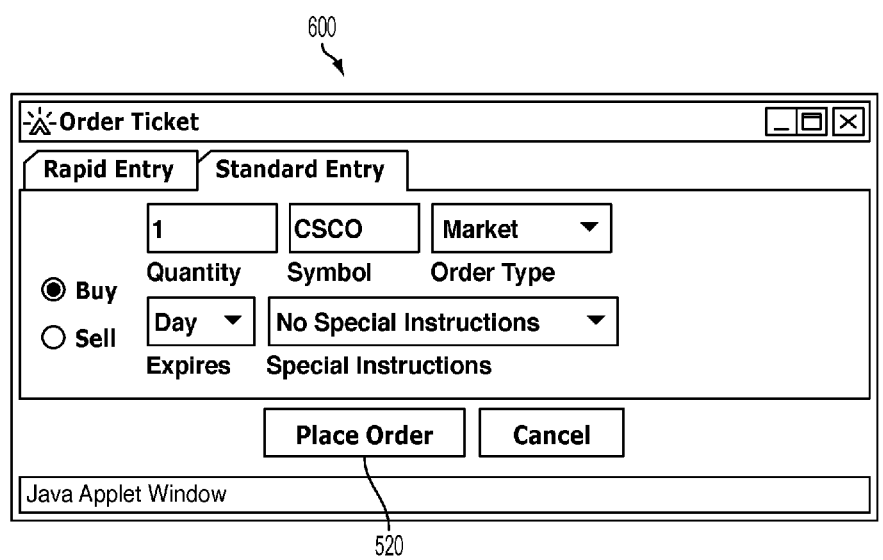
FIG. 6 illustrates a second exemplary order ticket preview interface according to this invention.

FIG. 6 illustrates an exemplary order ticket preview interface 600 that allows for the user to enter specifics regarding the particular transaction. For the exemplary order ticket preview interface 600 in FIG. 6, the user can manually enter whether the order is for buying or selling, the quantity, symbol information, order type, expiration and special instruction information. After populating one or more of these fields, the user can then select the place order button 520 to place the order as previously discussed.

Figure 7:
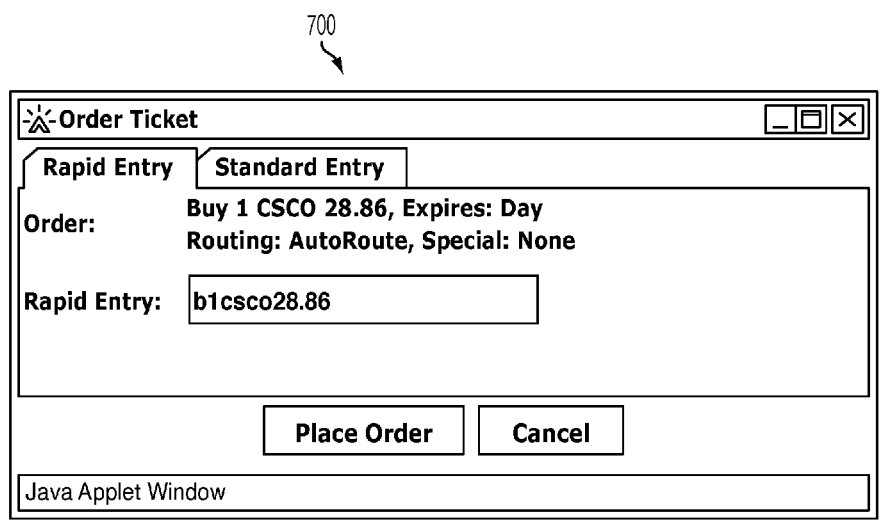
FIG. 7 illustrates a third exemplary order ticket preview interface according to this invention.

FIG. 7 illustrates an exemplary order ticket preview interface 700 that is generated when a user selects the split-buy button 335. Given that this interface is intended for rapidly conducting transactions, the order module 180 will automatically set the price point at or near the center of the spread. However, if the price midpoint is not an increment of one cent, or the spread is not divisible by two, the buy order can be placed at the next lowest whole one-cent price. In this example, the price point was automatically set at $28.86.

Figure 8:
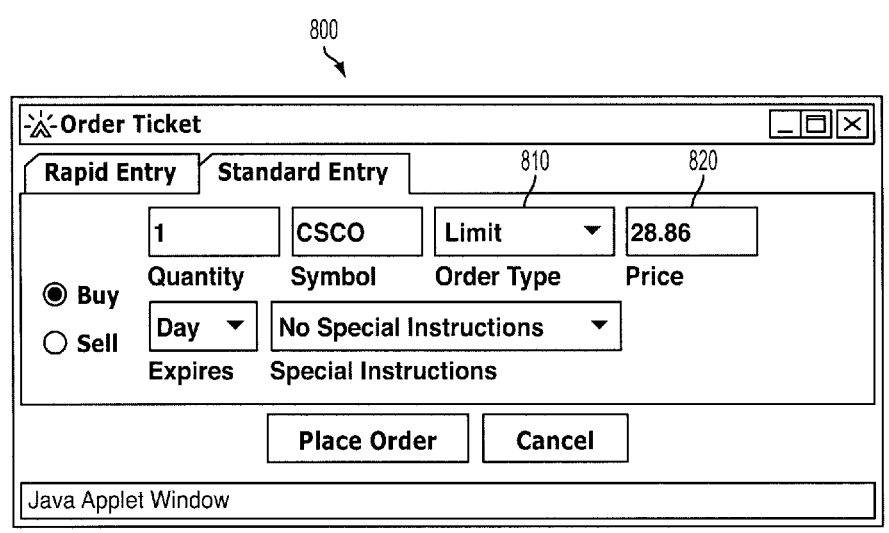
FIG. 8 illustrates a fourth exemplary order ticket preview interface according to this invention.

FIG. 8 illustrates an exemplary order ticket preview interface 800 that can be provided to allow standard entry of stock information upon selection of the split-buy button 335. As with the standard entry order ticket preview interface 600 of FIG. 6, the use can accept the pre-populated information in the order ticket and/or enter and/or modify specifics of the order.

However, since this is a split-buy transaction, the order type 810 is prepopulated by the order module 180 with the order type as "limit" and the price 820 set at the center of the spread.

Figure 9:
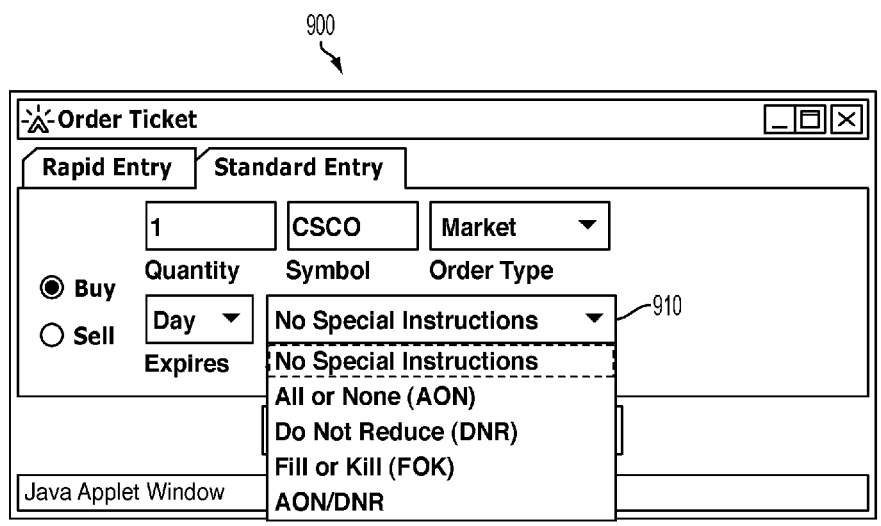
FIG. 9 illustrates a fifth exemplary order ticket preview interface according to this invention.

FIG. 9 illustrates an exemplary order ticket interface 900. The order ticket interface 900 specifically illustrates a plurality of special instructions 910 that can be selected by a user. These include or example All or None (AON), Do Not Reduce (DNR), Fill or Kill (FOK) and AON/DNR. However, it should be appreciated that these options can be modified based on, for example, the environment in which the quote and order system 100 is operating.

Figure 10:
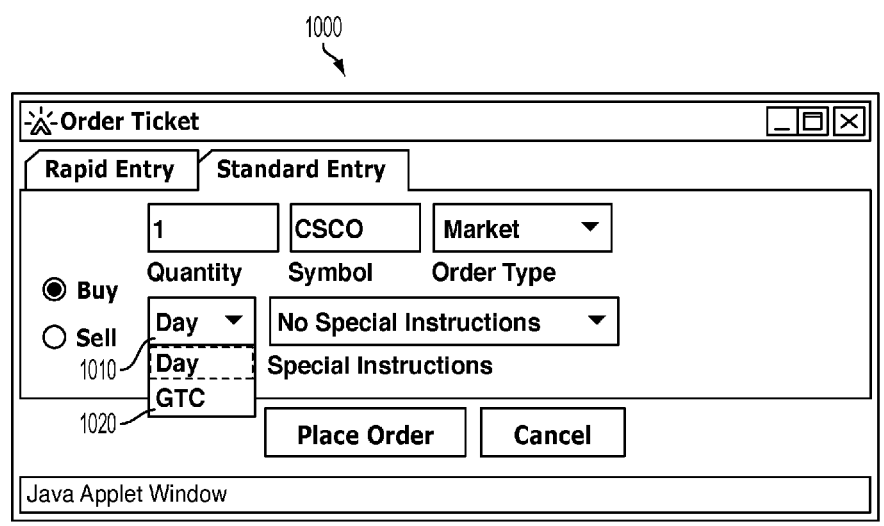
FIG. 10 illustrates a sixth exemplary order ticket preview interface according to this invention.

FIG. 10 illustrates an exemplary order ticket preview interface 1000 showing the options available for expiration information 1010. In accordance with this particular embodiment, a user can either select, from the drop down menu 1020, "day" or "GTC."

Figure 11:
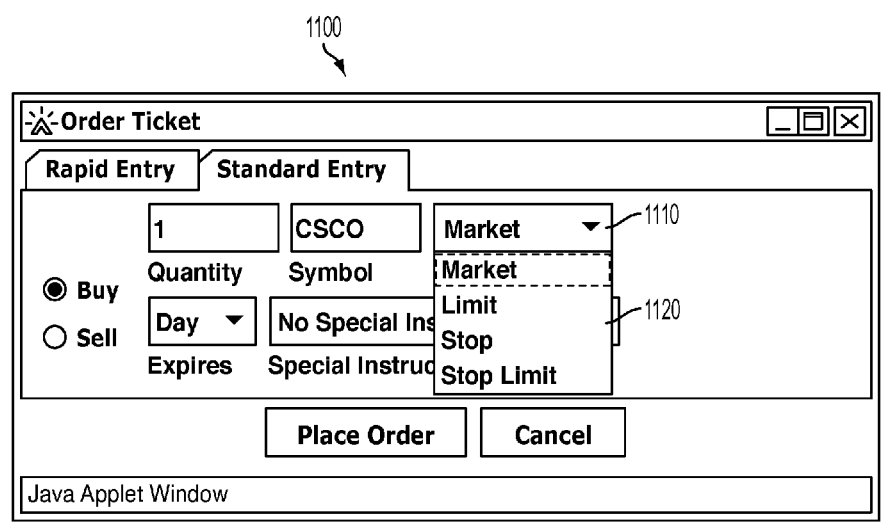
FIG. 11 illustrates a seventh exemplary order ticket preview interface according to this invention.

FIG. 11 illustrates an exemplary order ticket preview interface 1100 highlighting the order type selections 1010 a user can select from pull down menu 11 20. In particular, and for NASDAQ® trading, these can include market, limit, stop and stop limit.

Figure 12:
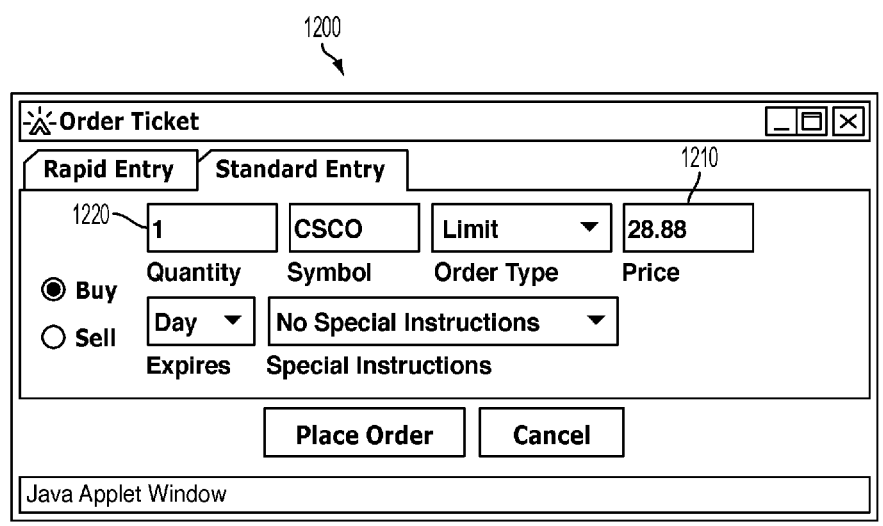
FIG. 12 illustrates an eighth exemplary order ticket preview interface according to this invention.

FIG. 12 illustrates an exemplary order ticket interface 1200 that is automatically generated by the order module 180 upon selection of a band within one of the buy quadrants. Upon selection, for example with the click of a mouse, of a band, the order module 180 prepopulates the order ticket 1200 with the stock symbol, price information 1210 of that band and the user preconfigured quantity information 1220.

Figure 13:
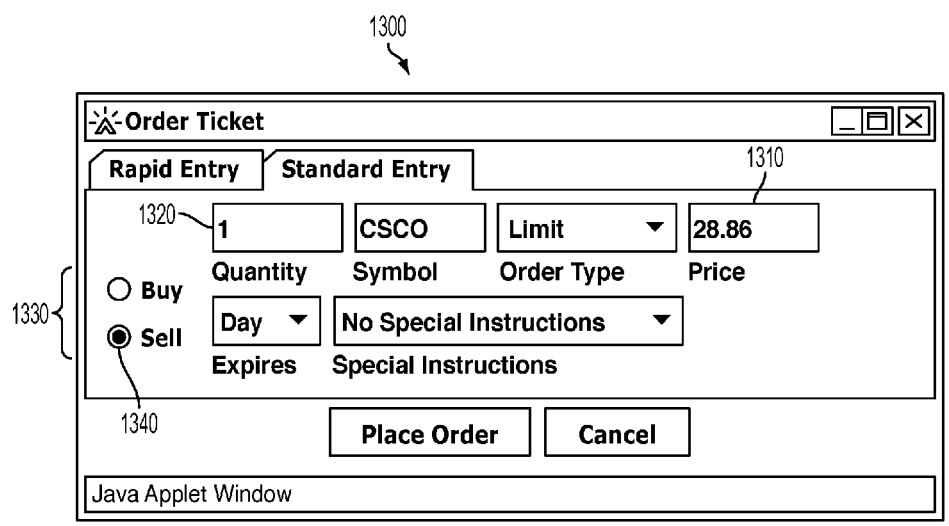
FIG. 13 illustrates a ninth exemplary order ticket preview interface according to this invention.

FIG. 13 illustrates an exemplary order ticket preview interface 1300 that is generated by the order module 180 when the user selects a band within one of the sell sections. Again, the price information 1310 and quantity information 1320 are prepopulated along with the appropriate buy or sell radio button 1330 corresponding to the type of transaction. In this case, since the user selected a band within the sell section, the sell radio button 1340 is highlighted.

While the above figures illustrate exemplary order ticket preview interfaces that use drop down menus and radio buttons to allow the user to select specific information, it should be appreciated that any type of pull down menu, scrolling menu, selectable button, check box or other interface can be used with equal success.

Furthermore, it should be appreciated that the information populating the rapid entry in standard entry portions of the order ticket preview interfaces can vary, for example, depending on the type of market, items being traded, operating environment, user preferences, or the like.

Figure 14:
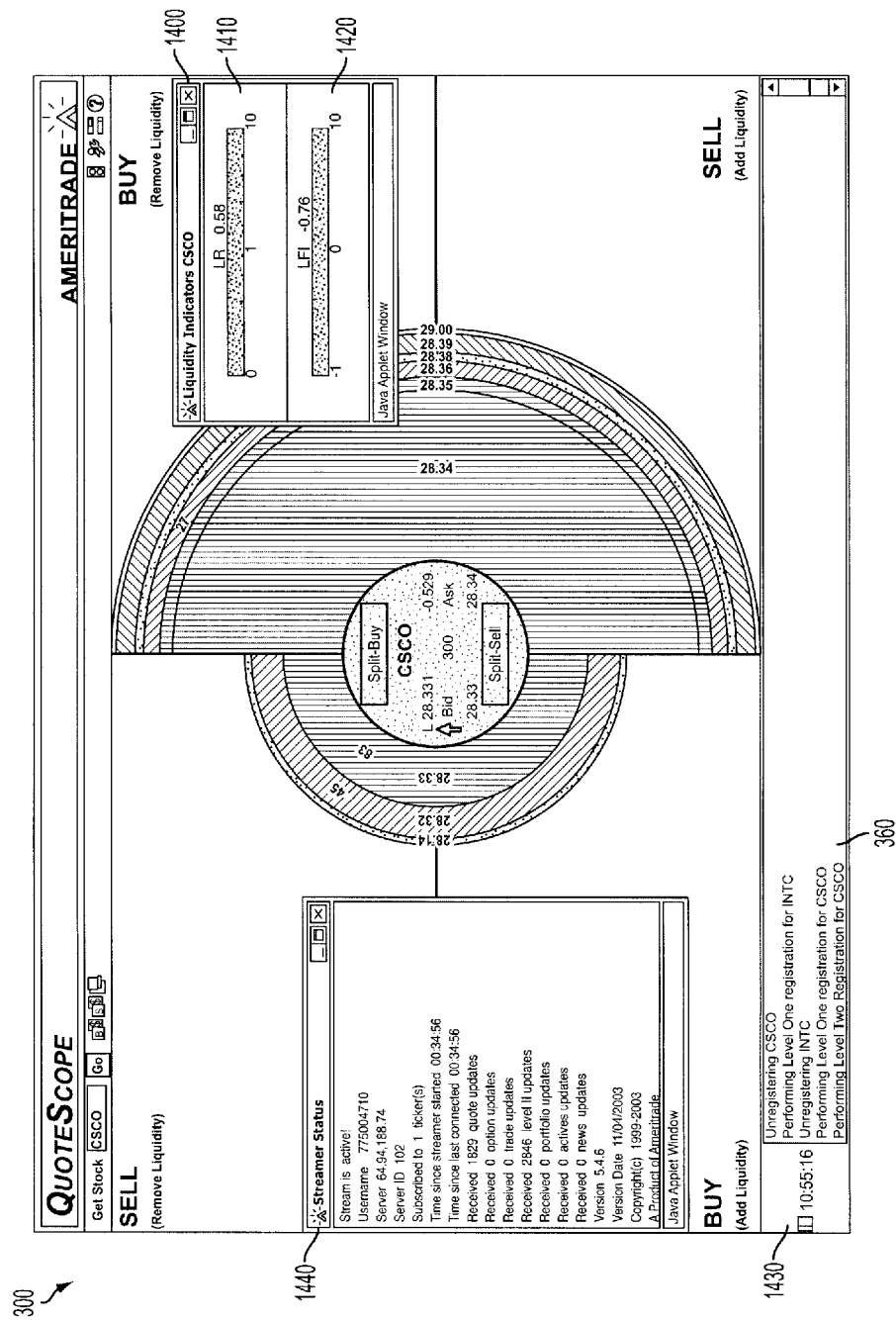
FIG. 14 illustrates an exemplary quote and order interface including a liquidity indicator according to this invention.

In addition to the basic quote and order interface, FIG. 14 illustrates additional advanced features that can be used in conjunction with the quote and order interface 300. These advanced features can be incorporated into the quote and order interface 300 or, in the exemplary embodiment illustrated in FIG. 14, displayed in a separate liquidity indicator window 1400. Specifically, the liquidity indicator window 1400 provides two liquidity indicators that supplement the visually displayed data, and in particular bands 315, shown in the quote and order interface 300. These indicators are capable of providing an "early warning signal" to traders to take action and can identify where liquidity is building. In accordance with this exemplary embodiment, the sizes of visual indicators are proportional to the liquidity changes and are colored green for bullish markets and red for bearish markets.

The first of the liquidity indicators is the liquidity ratio indicator 1410. The liquidity ratio (LR) is determined with the cooperation of the liquidity ratio module 160 and one or more of the I/O interface 110, memory 120 and processor 130. In particular, the liquidity ratio module 160 monitors incoming information from the quote information source 200 and measures the size of liquidity of the bid relative to the ask. The liquidity ratio module 160 takes a "snapshot" of size in real-time. The number of price points covered can be user selectable from, for example, 1-8. The value calculated by the liquidity ratio module 160 is graphically displayed through the use of a colored bar, or the like, in the liquidity ratio indicator 1410 in accordance with:

$$LiquidyRatio(LR) = \frac{SizeBid}{SizeAsk}.$$

The value, which can be represented one or more of the bar and a numerical value, will be a positive value from zero upwards where, for example, a value of three implies three times more size on the bid than the ask.

The second advanced feature is the liquidity flow indicator 1420. The liquidity flow indicator 1420 provides a visual indication of the liquidity flow from one side of the market to the other side of the market over a short period that can be user configurable for the displayed price points. For example, the liquidity flow indicator 1420 can measure liquidity from the bid to the ask side of the market, or from the ask to the bid side of the market. The value in the liquidity flow indicator 1420 is populated and determined by the liquidity flow indicator module 170, which, in cooperation with the quote information source 200, determines a value based on:

$$LiquidityFlowIndicator(LFI) = \frac{((BidTotal - PrevBidTotal) - (AskTotal - PrevAskTotal))}{(PrevBidTotal + PrevAskTotal)}$$

Thus, the value of the liquidity flow indicator 1420 will range from minus infinity to plus infinity where a value of zero implies no net (bid versus ask) liquidity changes.

Also illustrated in FIG. 14 is a status window 1440 accessible by selecting the status button 1430. For example the status button 1430 can provide basic status as to the connection of the quote and order system 100 to the quote information source 200. For example, the status button 1430 can be green to represent connectivity with one or more of the quote information source 200 and order processing back-end 250, yellow to represent, for example, network congestion, and red to indicate a problem communicating with one or more of the quote information source 200 and order processing back-end 250. The status window 1440 can display, for example, more specifics in relation to the stream of information requested from or received from one or more of the quote information source 200 and order processing back-end 250. Additionally, summary information, quote update information, option update information, trade update information, Level II update information, portfolio update information activity update information and news update information can be displayed. Also, any relevant error messages could be displayed.

Furthermore, the status window 1440 could "pop-up" in the event of an important or critical message, for example, to notify the user of an error with one or more of the quote and order system 100 or network communications, or, for example, as a trading aid to notify the user that, for example, "The market is closing in 5 minutes."

The status summary portion 360 can provide, for example, quick summary information such as when a previously placed order is complete, the current status of the system, a history, or any other information that may be deemed relevant to the use and/or status of the system As previously discussed, the quote and order interface 300 is completely configurable through a plurality of customization options that are available by selecting the preference icon 392. These customization options include options relating to the appearance, band proportions, band settings and order setting aspects of the quote and order system 100. All of these settings can be modified and saved through the user selecting a saved button within the preference interface (not shown) accessed through the preference icon 392. Furthermore, by selecting an "apply" button the changes can be applied for viewing by the user. However, as with all conventional windows interfaces, if the cancel button is selected the changes will not be implemented.

More particularly, appearance preferences include choices for color and font of the quote and order interface 300. Some exemplary color schemes include water, apple, speed, harvest, classic and suede. However, and in general, it should be appreciated that any color scheme can be used in conjunction with this invention as well as custom schemes and user defined schemes. When the colors for the quote and order interface 300 are changed, the colors for the sister applets, such as the liquidity indicators can also be changed.

In addition to color, users may adjust the font size that varies the size of the text in the price bands including price, size, and the market participant ID information. Altering the font size can also affect the size of the Level I data displayed in the center of the quote and order interface 300. In addition, status information in the status window 360 can also be altered in the same way.

In addition to basic color and font configurability, several different band configurations are available through the quote and order interface 300. These include, but are not limited to, linear proportions, logarithmic proportions, linear resizable proportions and scale to fit. Thus, a user can select a configuration preference that is not only aligned with their trading strategy, but also with, for example, the personality of the stock being monitored.

Specifically, by selecting linear proportioned bands a true linear proportionality is maintained between all bands 315, i.e., both primary (prices) and secondary (market participants). This will be the most liquidity-sensitive setting and can allow users to visually differentiate small liquidity changes within each price band. Linear proportioned bands also offer the best perspective of the relative liquidity between bid and ask sides of the market across all displayed price points. As an illustrative example, a band with lot size of 100 will be ten times the width of a band with lot size of 10.

Logarithmically proportioned bands will allow users to define the base value log X. This range of settings can allow users to adjust the proportionality between bands 315 and/or the overall size of the interface. Of course this setting is not as sensitive to liquidity changes as the linear proportions setting, but may be able to benefit users tracking stocks with very large size values at each price band. When stocks display both small and large size at their price points, it may be difficult to see the bands with smaller size relative to a band with a large size using the linear proportionality. When these conditions consistently exist for a stock, the logarithmic setting can be ideal. Users can make small adjustments to the proportions and overall size of the interface by varying the base value for the log. This value can be adjusted by, for example, dragging a slider (not shown) or by, for example, clicking to the left or right of a current slider setting. When this customization is used in conjunction with the minimum band width setting, it can allow the user a wide range of settings to best fit the trading needs of the user. As an example, with a base value of 10, a band with a lot size of 100 will be two times the width of a band with lot size of 10. With a base value of five a lot size 100 will be two times the width of a band with the lot size of five.

Linear resizable bands is very similar to linear proportion bands but has the flexibility of resizing the overall interface. By selecting a minimum bandwidth setting users are able to resize the overall interface while retaining the band proportions.

In addition to the various proportional band settings available, users can also have the ability to adjust the performance and amount of data viewed. Options that allow users to alter the refresh rates are very useful for users of, for example, less-powerful computers or those running slower Internet connections. For example, a first of the band settings defines the maximum number of bands to be displayed on one or more of the bid side 310 or ask side 320. With this setting, users can configure the number of price bands viewed, for example, from one to five. When Level II quote subscribers view NASDAQ® stocks they will be able to set the number of quoted price points displayed, while non-subscribers to Level II quotes may only be able to view the Level I quotes for NASDAQ stocks. When viewing listed equity quotes, quote and order system users can control how many market participants, i.e., exchanges, ECNs, or the like, are displayed across the interface. Some users may find benefit in only viewing the first two or three price points where other may desire a more complete view liquidity across the top price points.

A second band setting governs the minimum bandwidth. This setting allows users to adjust the overall size of the bands 315 within the quote and order interface 300. When used in conjunction with the logarithmic proportions and linear resizable band proportion options, setting the minimum bandwidth can offer a wide range of customization capabilities. Thus, once the band proportions are set, a resizing of the overall quote and order interface 300 view will occur. Users can also be provided with generic settings, such as small and large in addition to specific settings, such as a specific pixel value.

The band settings also include an arc refresh rate. This feature allows users to adjust the frequency of data updates and screen refreshes. Most user will probably opt for the highest possible settings. However, users who may be running older computers or have slow Internet connections may want to reduce the refresh rate to avoid performance issues.

As with the quote and order interface 300, the liquidity indicator 1400 refresh rate can also be selected. This feature allows users to adjust how often the indicator refreshes. Ideally, the setting should be set the same as the arc refresh rate to ensure consistency between market data and indicator changes. Most users will thus want to opt for the highest possible setting. However, as above, users with older computers or slower connections may want to reduce the refresh rate to avoid performance problems.

The last band setting allows users to toggle between viewing market participant information with individual size or viewing market participant information with aggregate size at each price point displayed. For example, when viewing Level II data on highly liquid, actively-traded stocks, users may find the number of market maker identifications overwhelming due to the number of market participants at each price point. Therefore, it may be advantageous to simply view the aggregate size by not enabling this option. Viewing market participant information with a logarithmic proportion setting can also reduce clutter and prevent "stacking" of the market maker identifiers.

Further customization options govern the order handling process. As briefly touched on before, users can maximize the capabilities of the quote and order system 100 by using the order entry tools and preferences available through the preference module 150 by selecting the preference icon 392. The order settings portion of the preference module 150 allows users to customize the settings associated with each of the three different order placing techniques. For example, if a user places an order by clicking a dynamic price band, a challenging task can be presented to the user when the prices are rapidly changing the width of the bands since the bands 315 are not static. However, the quote and order interface 300 includes tools to help handle this type of situation and to help reduce the risk of an improper order entry.

Users can switch between long and short transactions. When placing a short sale or buy to cover order, this option must be selected. However, when this setting is enabled, the four order quadrants of quote and order interface 300 will change labels to reflect the type of order being placed. In particular, the four quadrants will be modified to reflect "buy/sell" or "buy to cover/sell short." If the "perform short order transaction" order setting option is not selected, the transactions will be long purchases and sales.

As discussed above, it may be preferable upon first accessing the quote and order interface 300 to disable the price band ordering. This can prevent users from inadvertently placing an order by accidentally clicking within a price band. Alternatively, by enabling the order entry sections and allowing the placing of an order by clicking in the price bands, orders submitted by clicking on the price point in any quadrant will submit a limit order at the price as defined by the liquidity band on which the user specifies. In accordance with traditional NASDAQ® Level II trading, the order will be good for the day for a share amount that the user has preselected. As a precautionary measure, when a user desires to select this feature, the users can be asked to agree with terms of use of the quote and order system service and be requested accept specific liability.

The users also have the option of disabling the order ticket preview interface. The order ticket preview interface supplements the order ticket confirmation interface which is controlled by whether the "express trading" service has been selected in conjunction with price band purchasing. Because order placement can be very streamlined and quick using the quote and order interface 300, both an order ticket preview interface and an order ticket confirmation interface are provided to the user. Therefore, once access to price band ordering is enabled, a user can select how many layers of review is preferred before the order is placed. For example, if express trading has been activated, only an order ticket confirmation interface will be displayed. Upon selection of the confirm order button 552, the order is placed. If express trading is not activated, acknowledgment of the order ticket preview interface and the order ticket confirmation interface will be required before the order is sent.

For example, for very active intra-day traders, both express trading can be activated as well as disabling of the order ticket confirmation interface. This allows for a true one-click real-time order entry process.

To reduce the risk of placing unwanted orders, users have the option of "freezing" the quote and order interface 300 by selecting the stop updates icon 398 or by, for example, right clicking within the quote and order interface 300 to reduce the risk of clicking the wrong price band as a result of a change to the size of the band. Thus, users can toggle between starting and stopping screen refreshes through either a right click in the quote and order interface 300 or by selecting the stop updates icon 398.

Users can set a default share amount for all orders placed through the quote and order system 100. In addition to the default share amount, users can further define default share amounts for specific stocks or based on other criteria as appropriate through the use of preference profiles stored in the preference module 150. Thus, once the share amount has been set, all orders will be prepopulated with the set share quantity. Of course, the share amount can be changed during the order review process provided the order ticket preview feature has not been disabled.

FIG. 15 illustrates an exemplary order ticket confirmation interface 500. The order ticket interface 550 is the last "safety stop" before the order is placed. Upon selection of the confirm button 552, the order is place in accordance with the order summary information 555. However, should the user desire to edit the order, a back button (not shown) can be selected to return the user to the order ticket preview screen where edits can be made, or the cancel button 554 selected to cancel the order in its entirety.

Figure 16:
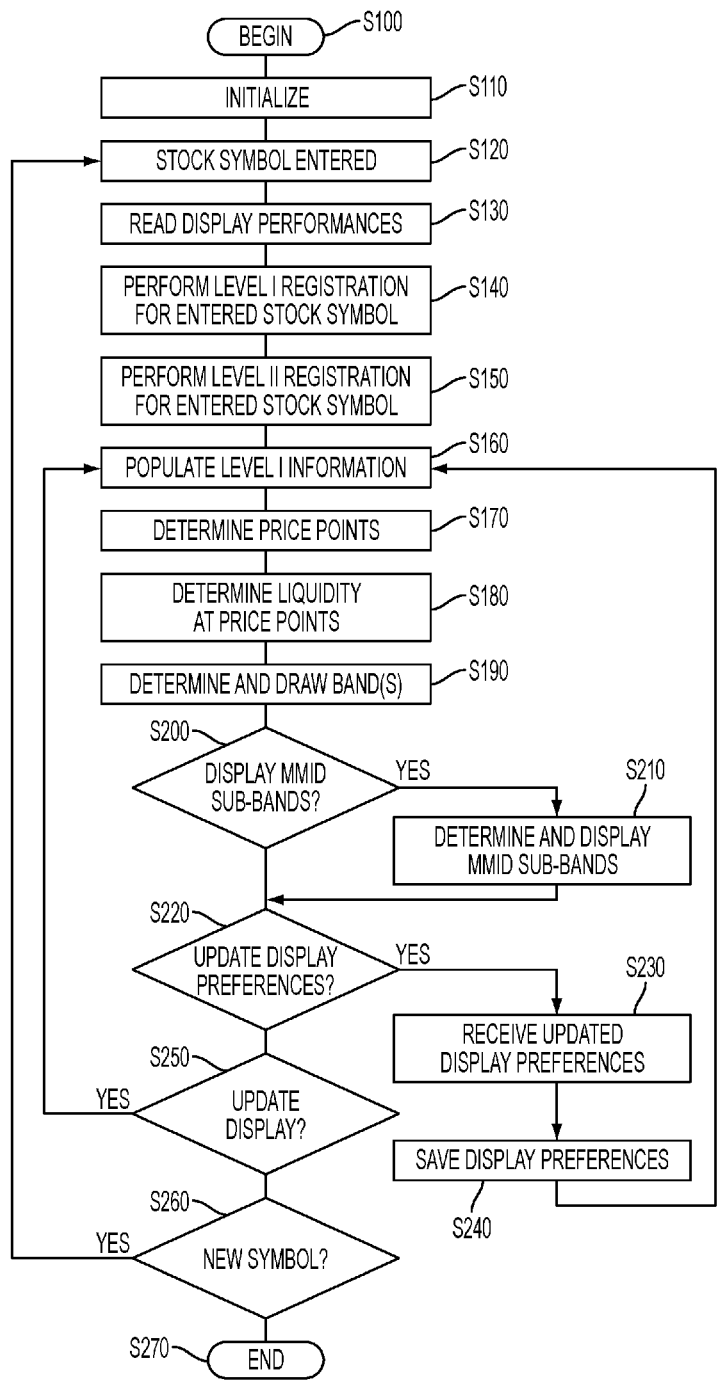
FIG. 16 is a flowchart outlining an exemplary method of operation according to this invention.

FIG. 16 is a flowchart illustrating the exemplary operation of the quote and order system 100. In particular, control begins in step S100 and continues to step S110. In step S110, the system is initialized and communication with one or more quote information sources is commenced. Next, in step S120, a stock symbol is entered. Then, in step S130, the system reads the display preferences in preparation for populating the quote and order interface. Control then continues to step S140.

In step S140, Level I registration is preformed for the entered stock symbol. Next, step S150, Level II registration is preformed for the entered stock symbol. Then, in step S160 the Level I information is populated in the center of the quote and order interface. Control then continues to step S170.

In step S170, the various price points for the entered stock symbols are determined. Next, in step S180, the liquidity at the various price points is determined. Then, in step S180, the bands that surround the Level I information are determined and displayed. Control then continues to step S200.

In step S200, a determination is made whether the marker maker identification sub-bands are to be displayed, if the market maker identification sub-bands are to be displayed, control continues to step S210 where the market maker identifiers and associated size are displayed within each price point. Otherwise, control jumps to step S220.

In step S220, a determination is made whether the display preferences have been updated, if display preferences have been updated, control continues to step S230. In step S230, the updated display preferences are received. Next, in step S240, if the display preferences are saved, control jumps back to step S160. Otherwise, control jumps to step S250. In step S250, a determination is made whether to update the display.

For example, this updating can be preformed on a user request or, for example, as previously discussed based on a user selected refresh rate. If the display is to be updated, control jumps back to set S160. Otherwise, control continues to step S260.

In step S260, a determination is made whether a new symbol has been entered. If a new symbol has been entered, control jumps back to step S120. Otherwise, control continues to step S270 where the control sequence ends.

Figure 17:
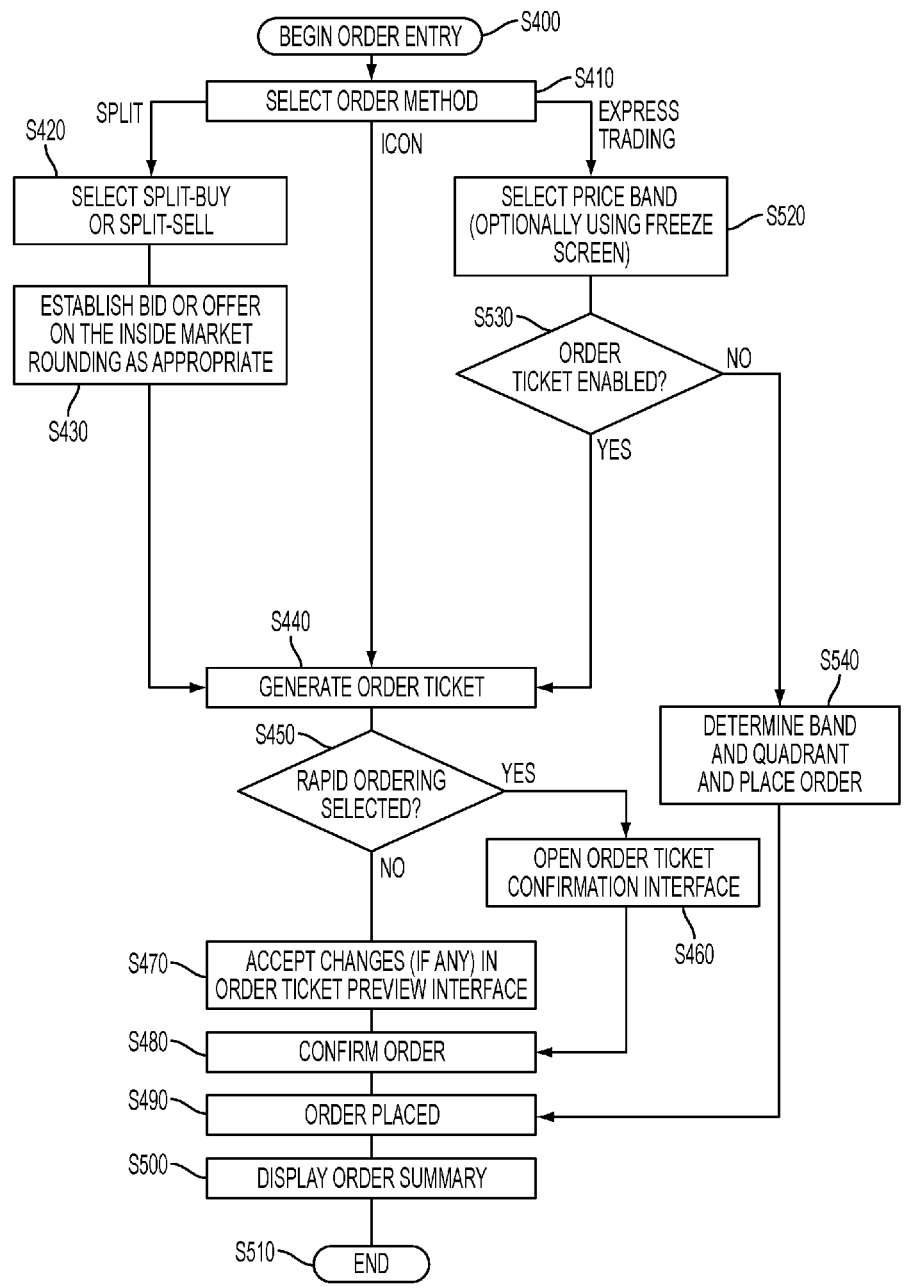
FIG. 17 is a flowchart outlining an exemplary order process according to this invention.

FIG. 17 outlines an exemplary ordering method according to this invention. In particular, control begins in step S400 and continues to step S410. In step S410, a determination is made as to which ordering method is selected. If one of the split methods is selected, control continues to step S420. If either of the buy or sell icon is selected, control continues to step S440. Otherwise, if express trading has been selected, for trading by clicking within a price band, control continues to step S520.

In step S420, a user selection one or the other of split-buy or split-sell is recognized. Next, in step S430, a bid or offer is established on the inside market, rounding as appropriate. Then, in step S440, an order ticket is generated that has been prepopulated as previously discussed. Next, in step S450, a determination is made whether rapid ordering has been selected. If rapid ordering has been selected, control continues to step S460 wherein the order ticket confirmation interface is generated. Control then continues to step S450. Otherwise, control jumps to step S470 where a user can enter and except changes if any in the order ticket preview interface. Control then continues to step S480.

In step S480, the user confirms the order and control continues to step S490 where the order is placed. The order summary can then be displayed in step 500, for example, in the scrollable summary portion 360 of the quote and order interface 300. Alternatively, by selecting the order summary icon 390 a user can be taken to an order and/or account summary page (not shown). Control then continues to step S510 where the control sequence ends.

Alternatively, if the user selects the express trading method, control continues to step S520 from step S410. In step S520, the system detects selection of a price band which may or may not have been frozen through the use of the stop update icon 398. Then, step S530, a determination is made whether the order ticket display has been enabled. If the order ticket display has been enabled, control continues to step S440. Otherwise, control jumps to step S540 where determination is made as to the user selected band and section. Based on the selected band and the section, the order is assembled and control continues to step S490 where the order is placed.

While the above described flowcharts have been discussed in relation to a particular sequence of events, it should be appreciated that minor changes to this sequence can occur without materially effecting the operation of the invention.

The above-described system can be implemented on a computing device, such as a personal computer, PDA, internet enabled telephone, dedicated trading computer, or the like, or a separate programmed general purpose computer having a communications device. Additionally, the systems and methods of this invention can be implemented on a special purpose computer, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing a state machine that is in turn capable of implementing the processes described herein can be used to implement the quote and order system according to this invention.

Furthermore, the disclosed methods may readily implemented in software using object or object-oriented software development environments that provide portable source code that can be used on a variety of computer or workstation platforms. Alternatively, the disclosed system may be implemented partially or fully in hardware using standard logic circuits or, for example, a VLSI design. Whether software or hardware is used to implement the systems in accordance with this invention is dependent on the speed and/or efficiency requirements of the system, particular function, and the particular software or hardware systems or microprocessor or microcomputer systems being utilized. The systems and methods illustrated herein can be readily implemented in hardware and/or software using any suitable systems or structures, devices and/or software, such as JAVA®, by those of ordinary skill in the applicable art from the functional description provided herein and with a basic general knowledge of the computer and telecommunications arts.

Moreover, the disclosed methods may be readily implemented in software executed on a programmed general purpose computer, a special purpose computer, a microprocessor, or the like. In these instances, the systems and methods of this invention can be implemented as a program embedded on a personal computer such as a JAVA®, CGI or Perl script, as a resource resigning on a server or graphics workstation, as a routine embedded in a dedicated trading system, or the like. The systems and methods of this invention can also be implemented by physically incorporating this system and method into a software and/or hardware system, such as the hardware and software systems of a computer.

We claim:

1. A system for dynamic display of information, the system comprising:
a computer processing device including an interface module adapted to receive information from an information source, the information including stock market information and financial data information, the interface module assembling the received information in an interactive user interface, the interactive user interface including a display device to display the information using an arrangement of juxtaposed bands, each band having a variable width dependent upon a component of the received information corresponding to that band, and the bands are displayed in a concentric arrangement.

2. The system of claim 1, wherein the information includes stock price information, stock size information, last price information, bid tick information, bid price information, price change for day information, ask price information, last size information, market participant information, market-maker information, exchange identifiers, and Electronic Communication Network identifiers.

3. The system of claim 1, wherein the information component includes one of an ask size and a bid size.

4. The system of claim 1, wherein each of the bands is individually selectable to execute a desired function.

5. The system of claim 4, wherein upon selection of one of the bands, an order module assembles an order based on the information component associated with the selected band.

6. The system of claim 1, wherein the arrangement of juxtaposed bands includes a first plurality of juxtaposed bands and a second plurality of juxtaposed bands, the first and second pluralities of juxtaposed bands being displayed on opposite sides of a common center so as to oppose each other.

7. The system of claim 6, wherein the first plurality of juxtaposed bands and the second plurality of juxtaposed bands form one of a circular, elliptical, oval, square, rectangular, hexagonal or octagonal shape.

8. The system of claim 7, wherein the widths of the first plurality of juxtaposed bands are variable dependent upon corresponding ask size information components, and the widths of the second plurality of juxtaposed bands are variable dependent upon corresponding bid size information components.

9. The system of claim 1, wherein bands are resizable based on at least one of linear proportions, logarithmic proportions, and scale to fit.

10. The system of claim 1, wherein the bands are user configurable such that at least one of color, size, font, refresh rate, minimum band width, maximum band width and proportionalities can be selected.

11. The system of claim 1, further comprising a summary module configured to display at least one of a summary information and order information.

12. The system of claim 1, wherein each band can have a different color that others of the bands.

13. The system of claim 1, further comprising an order module configured to assemble and display one or more of an order preview interface and an order confirmation interface.

14. The system of claim 1, further comprising a stop-button display that can be selected to freeze the bands.

15. A method comprising:
receiving, at an interface module of a computer processing device, information from an information source, the information including stock market information and financial data information;
assembling the received information in an interactive user interface; and
displaying, using a display device, the information using an arrangement of juxtaposed bands, each band having a variable width dependent upon a component of the received information corresponding to that band, and the bands are displayed in a concentric arrangement.

16. The method of claim 15, wherein each of the bands is individually selectable to execute a desired function.

17. The method of claim 15, wherein the arrangement of juxtaposed bands includes a first plurality of juxtaposed bands and a second plurality of juxtaposed bands, the first and second pluralities of juxtaposed bands being displayed on opposite sides of a common center so as to oppose each other.

18. A non-transitory computer-readable medium having instructions stored thereon, that when executed by a computing device cause the computer device to perform operations comprising:
receiving, at an interface module of a computer processing device, information from an information source, the information includes stock market information and financial data information;
assembling the received information in an interactive user interface; and
displaying, using a display device, the information using an arrangement of juxtaposed bands, each band having a variable width dependent upon a component of the received information corresponding to that band, and the bands are displayed in a concentric arrangement.

19. The non-transitory computer-readable medium of claim 18, wherein each of the bands is individually selectable to execute a desired function.

20. The non-transitory computer-readable medium of claim 18, wherein the arrangement of juxtaposed bands includes a first plurality of juxtaposed bands and a second plurality of juxtaposed bands, the first and second pluralities of juxtaposed bands being displayed on opposite sides of a common center so as to oppose each other.

* * * * *